(12) United States Patent
Maiman et al.

(10) Patent No.: US 11,062,191 B1
(45) Date of Patent: Jul. 13, 2021

(54) TRANSACTION CARD INCLUDING TEAR ELEMENT

(71) Applicant: Capital One Services, LLC, McLean, VA (US)

(72) Inventors: Tyler Maiman, Melville, NY (US); Abdelkader M'Hamed Benkreira, Washington, DC (US); Brendan Way, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/880,418

(22) Filed: May 21, 2020

(51) Int. Cl.
G06K 19/073 (2006.01)
G06K 19/14 (2006.01)
G06K 19/077 (2006.01)
G06K 19/04 (2006.01)

(52) U.S. Cl.
CPC ..... G06K 19/07381 (2013.01); G06K 19/042 (2013.01); G06K 19/07722 (2013.01); G06K 19/145 (2013.01)

(58) Field of Classification Search
CPC ........... G06K 19/07381; G06K 19/042; G06K 19/07722; G06K 19/145
USPC ....................................................... 235/492
See application file for complete search history.

(56) References Cited

U.S. PATENT DOCUMENTS

| | | | | |
|---|---|---|---|---|
| 5,936,227 | A | * | 8/1999 | Truggelmann ....... G06K 19/077 235/492 |
| 6,554,193 | B1 | | 4/2003 | Fehrman et al. |
| 7,490,754 | B2 | | 2/2009 | Opferbeck |
| 9,048,525 | B2 | * | 6/2015 | Matsushita ...... G06K 19/07749 |
| 2005/0220377 | A1 | | 10/2005 | Hanus |
| 2008/0041965 | A1 | * | 2/2008 | Phillips ................ G06K 19/077 235/492 |
| 2009/0302111 | A1 | * | 12/2009 | Woodard ........... G08B 13/2408 235/449 |
| 2014/0262903 | A1 | | 9/2014 | Mitten et al. |
| 2015/0060553 | A1 | * | 3/2015 | Huang ............... G06K 19/0776 235/488 |

* cited by examiner

Primary Examiner — Michael G Lee
Assistant Examiner — David Tardif
(74) Attorney, Agent, or Firm — Kacvinsky Daisak Bluni PLLC

(57) ABSTRACT

Provided are approaches for removing an identification chip of a transaction card using a tear element. In some approaches, the transaction card may include a body, the identification chip coupled to the body, and the tear element disposed between the identification chip and the body. The tear element is operable to decouple the identification chip from the body when the tear element is pulled or otherwise moved away from the body.

20 Claims, 5 Drawing Sheets

TRANSACTION CARD INCLUDING TEAR ELEMENT

FIELD

Embodiments of the present disclosure relate to transaction cards and, more particularly, to transaction cards including a tear element.

BACKGROUND

Transaction cards, such as credit cards and debit cards, typically contain account information such as the account number, owner's name, and expiration date. This information may be provided in different formats, and at different positions along the card. In one format, text is embossed into or printed on the plastic of the card for use visually. In a second format, a magnetic stripe containing the information in a computer-readable form may be provided along the back of the card. In a third format, information is contained on an identification chip coupled to the front of the card. When the card is no longer useful, such as after the card is expired or is cancelled, it is desirable to destroy the information recorded on the card for security reasons.

The current approach for destruction of plastic cards is to cut the card into a number of small pieces so that it is difficult to reconstruct the data from the pieces. However, this process can be laborious. Furthermore, with some types of cards, such as with metal cards, typical destruction methods are not easily achieved. Thus, it would be desirable to have approaches for inactivating the transaction card by physically removing the identification chip therefrom.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body, an identification chip coupled to the body, and a tear element disposed between the identification chip and the body, wherein the tear element is operable to decouple the identification chip from the body when the tear element is moved away from the first main side of the body.

In another approach according to the disclosure, a transaction card may include a body having a first main side opposite a second main side, an identification chip coupled to the first main side of the body, and a tear strip sandwiched between the identification chip and the first main side of the body. The tear strip is operable to decouple the identification chip from the body when the tear strip is moved away from the body.

In yet another approach according to the disclosure, a method may include providing a body of a transaction card, the body including a first main side opposite a second main side, and forming a tear element along the first main side of the body. The method may further include coupling an identification chip to the first main side of the body, wherein the tear element is sandwiched between the identification chip and the first main side of the body.

BRIEF DESCRIPTION OF THE DRAWINGS

The accompanying drawings illustrate example approaches of the disclosure, including the practical application of the principles thereof, as follows.

Figure 1:
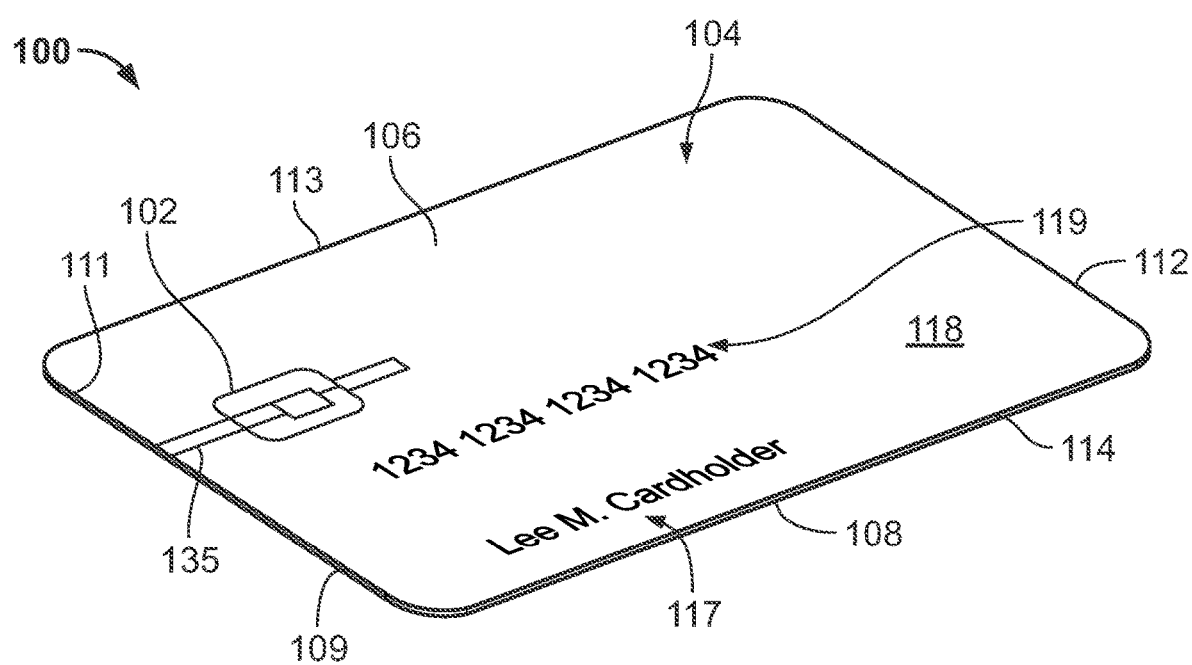
FIG. 1 is a perspective view illustrating a transaction card, in accordance with embodiments of the present disclosure.
Figure 2:
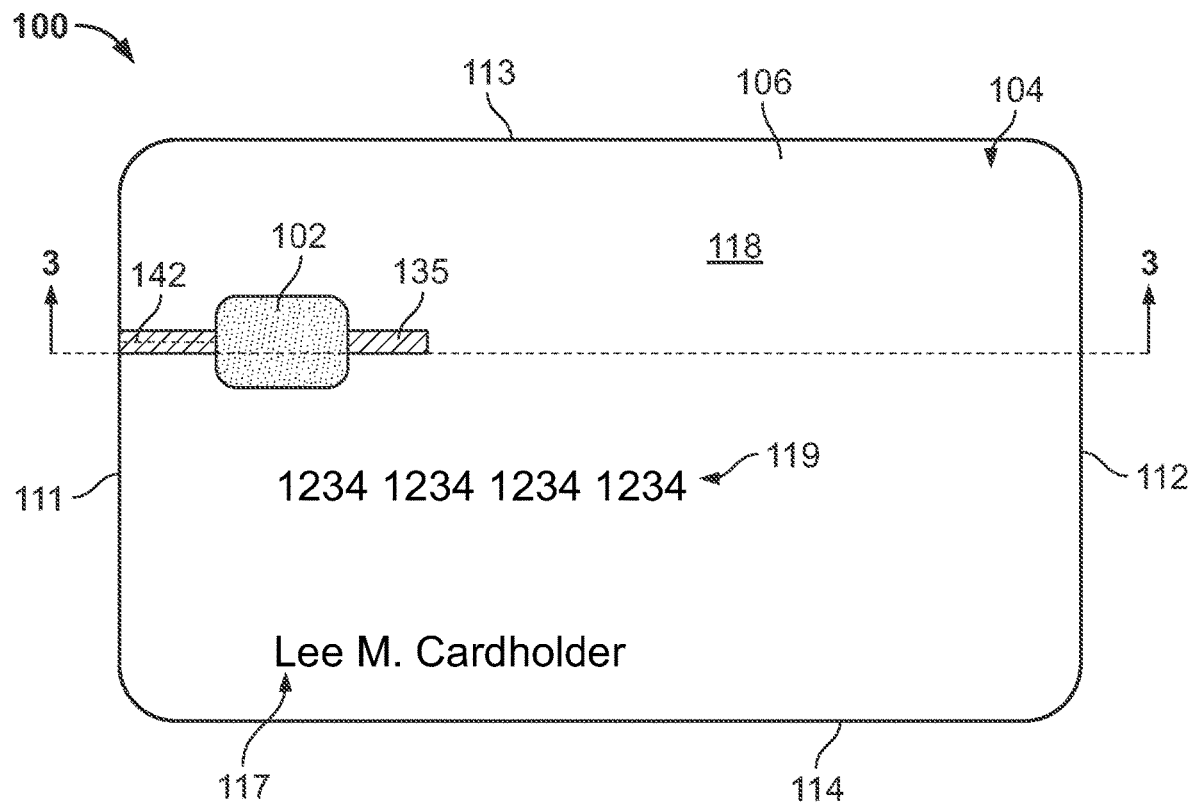
FIG. 2 is a top/front view of the transaction card of FIG. 1, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including an identification (ID) chip, such as a RFID chip, and a tear element operable to decouple the identification chip from the card. The tear element may be located within the card structure, e.g., underneath an external layer and the identification chip. As the tear element is pulled or otherwise moved away from the transaction card, the identification chip may be dislodged and removed from the transaction card without the use of typical card destruction tools.

Referring now to FIGS. 1-4, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester or polycarbonate. Described sometimes herein as contactless due to the method of communication by an identification chip 102, such as an EMV chip, the card 100 may also provide one or more functions requiring contact. For example, the card 100 may include a magnetic stripe 103 (FIG. 4) and/or a microchip connected to contacts present on an outer layer of the card 100.

As shown, the card 100 may include a body 104 having a first main side 106 and a second main side 108 opposite the first main side 106. Although non-limiting, the first main side 106 may correspond to a front or top side of the card 100, while the second main side 108 may correspond to a back or bottom side of the card 100. The first main side 106 and the second main side 108 are joined by a side surface 109 extending around a perimeter of the body 104. The body 104 may further include a first end 111 opposite a second end 112, and a first side 113 opposite a second side 114.

As shown, the first main side 106 may include an exterior layer 118 containing identifying indicia, such as an account holder name 117 and/or a card number 119. Although non-limiting, the card number 119 may be a 16-digit number (e.g., four groups of four digits). In other embodiments, the card number 119 may include a different number of digits. The identifying indicia may be printed over/on the exterior layer 118. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

In some embodiments, the exterior layer 118 may be a polymer-based material, e.g., a polyester, polyvinylchloride (PVC), polypropylene, polyethylene, acrylic, polycarbonate, and/or like material. Although non-limiting, the exterior layer 118 may be transparent. In other embodiments, the exterior layer 118 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner.

Figure 4:
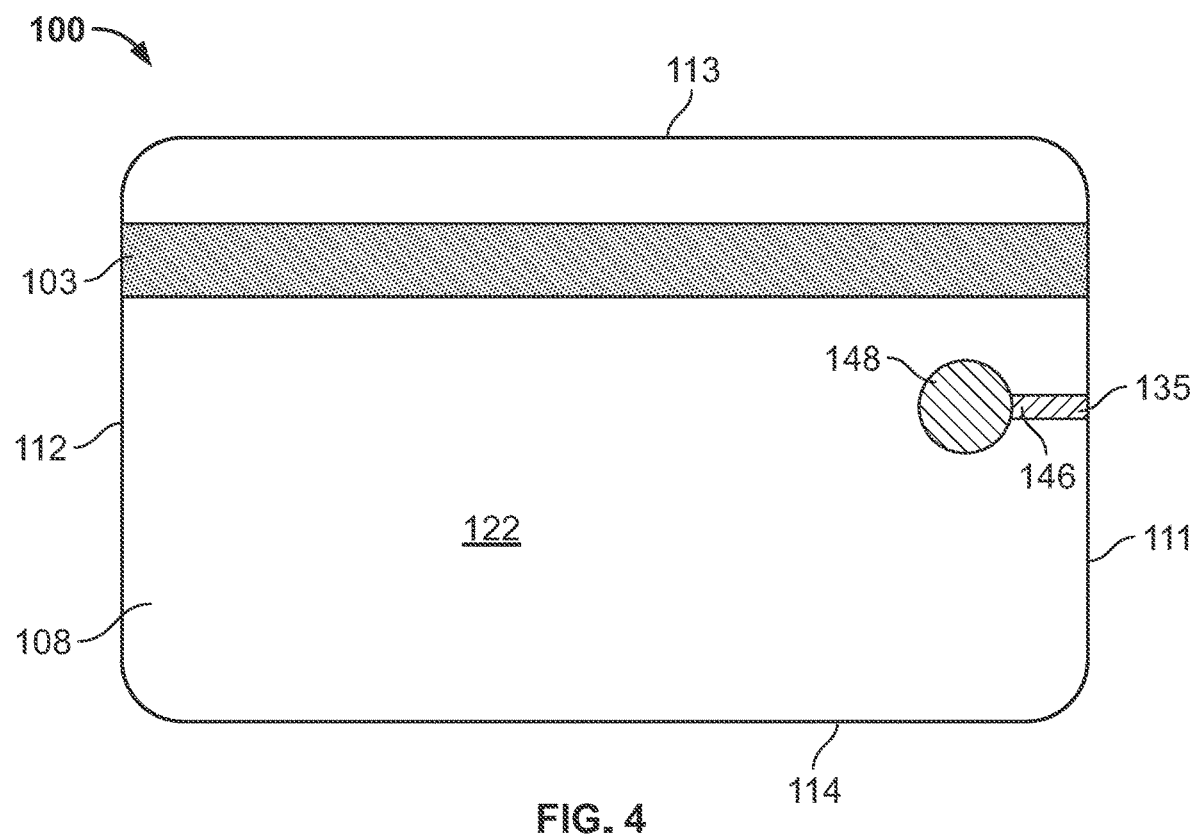
FIG. 4 is a bottom/back view of the transaction card of FIG. 1, in accordance with embodiments of the present disclosure.

As best shown in FIG. 4, the card 100 may also include the magnetic stripe 103 provided on the second main side 108 of the body 104. In some embodiments, the magnetic stripe is part of a second exterior layer 122. In other embodiments, the magnetic stripe 103 is disposed atop or beneath the second exterior layer 122. The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation. Embodiments herein are not limited in this context.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip.

Referring again to FIGS. 1-3, the identification chip 102 may be coupled (e.g., recessed or partially embedded) to the first main side 106 of the card 100. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may further include a tear element 135 positioned beneath the identification chip 102. As shown, the tear element 135 may be disposed between the identification chip 102 and the body 104, wherein the tear element 135 is operable to decouple the identification chip 102 from the body 104 when the tear element 135 is pulled, lifted, or otherwise moved away from the first main side 106 of the body 104. In some embodiments, the exterior layer 118 may include a notch or a set of perforations 142 (FIG. 2) aligned over the tear element 135 to make it easier for the tear element 135 to break through the exterior layer 118 when pulled. It will be appreciated that the exterior layer 118 may include any configuration or number of weakened portions, scores, and/or cuts to encourage the tear element 135 along an intended path through the exterior layer 118.

Although non-limiting, the tear element 135 may be a string, strip, thread, etc., of material configured to tear/move along a predetermined path. More specifically, the tear element 135 may be a cord, wire, string, yarn, fiber strand, filament, floss or any other type of elongated object that can be pulled to break or tear through the exterior layer 118. The tear element 135 may be straight or may form a pattern. The tear element 135 may be adhesive or non-adhesive. It will be appreciated that the tear element 135 may have a tensile strength great enough to tear through the exterior layer 118 and remove the identification chip 102 without breaking. Although the tear element 135 is depicted as being visible, it will be appreciated that the tear element 135 can be hidden or partially hidden by the exterior layer 118 and/or the second exterior layer 122.

Figure 3:
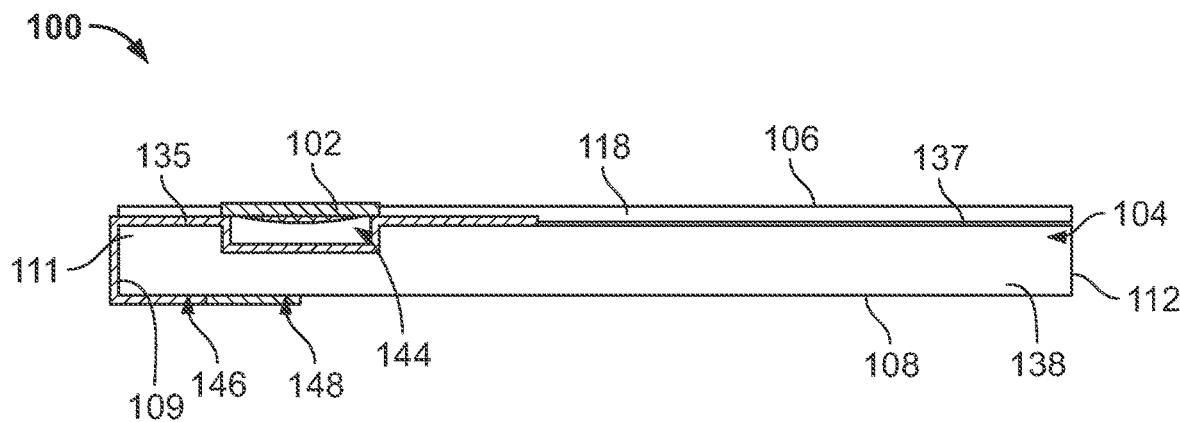
FIG. 3 is a side cross-sectional view of the transaction card of FIG. 2, in accordance with embodiments of the present disclosure.

As shown in FIGS. 3-4, the tear element 135 may be disposed between the exterior layer 118 and an upper surface 137 of an interior structure 138 of the body 104. Although non-limiting, the tear element 135 may extend between the first end 111 of the body 104 and a recess 144 of the body 104. As shown, the tear element 135 may continue past the recess 144, along the upper surface 137 of the interior structure 138. In some embodiments, the tear element 135 may extend completely to the second end 112. In other embodiments, the tear element 135 may extend from the first side 113 and/or the second side 114 of the body 104. In yet other embodiments, more than one tear element 135 may be present. Embodiments herein are not limited in this context.

Figure 5:
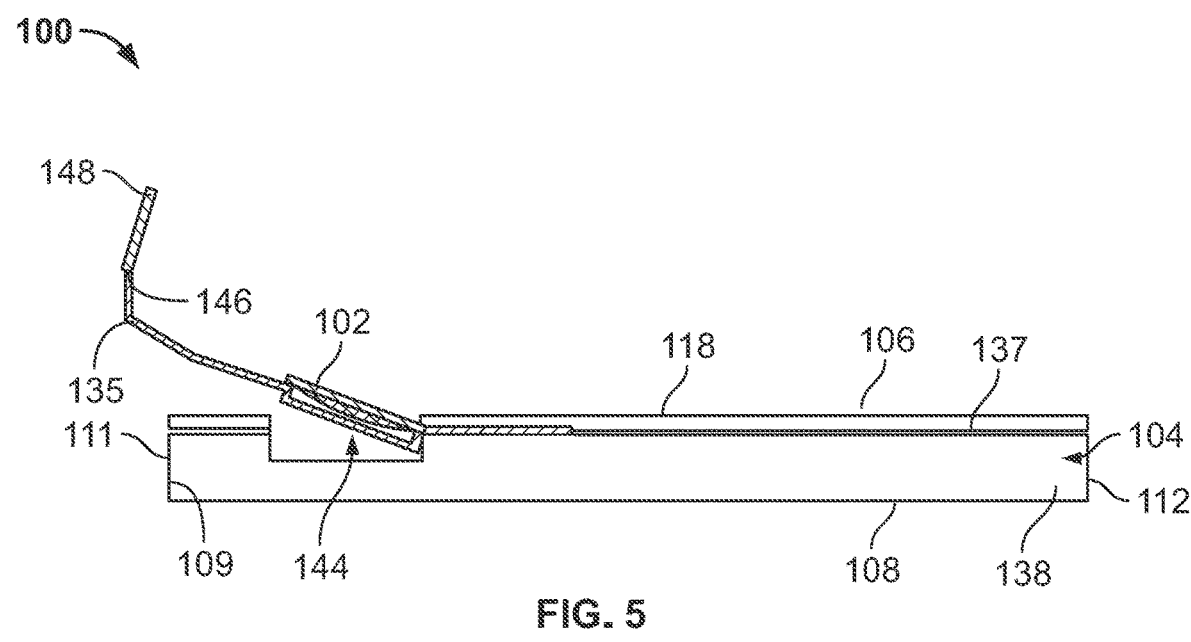
FIG. 5 is a side cross-sectional view of the transaction card of FIG. 2 during removal of an identification chip, in accordance with embodiments of the present disclosure.

As further shown, the tear element 135 may extend along the side surface 109 and along the second main side 108 of the body 104. A free end 146 of the tear element 135 may be secured to the second main side 108 by a removable component 148, such as an adhesive cover or tab, which may be subsequently removed by a user to lift the free end 146 of the tear element 135 from the body 104, as demonstrated in FIG. 5. In some embodiments, the removable component 148 may remain secured to the free end 146 of the tear element 135 as the tear element 135 is pulled away from the body 104. Removing the tear element 135 away from the first main side 106 and towards the second end 112 of the body 104 causes the identification chip 102 to be lifted from the first main side 106. The user may continue to pull the tear element 135 until the tear element 135 and the identification chip 102 are completely separated from the body 104. In other embodiments, the tear element 135 may remain partially secured to the body 104, while the identification chip 102 is "popped" out of the recess 144. The user is then free to discard or destroy the identification chip 102 without having to destroy the remainder of the card 100.

Figure 6:
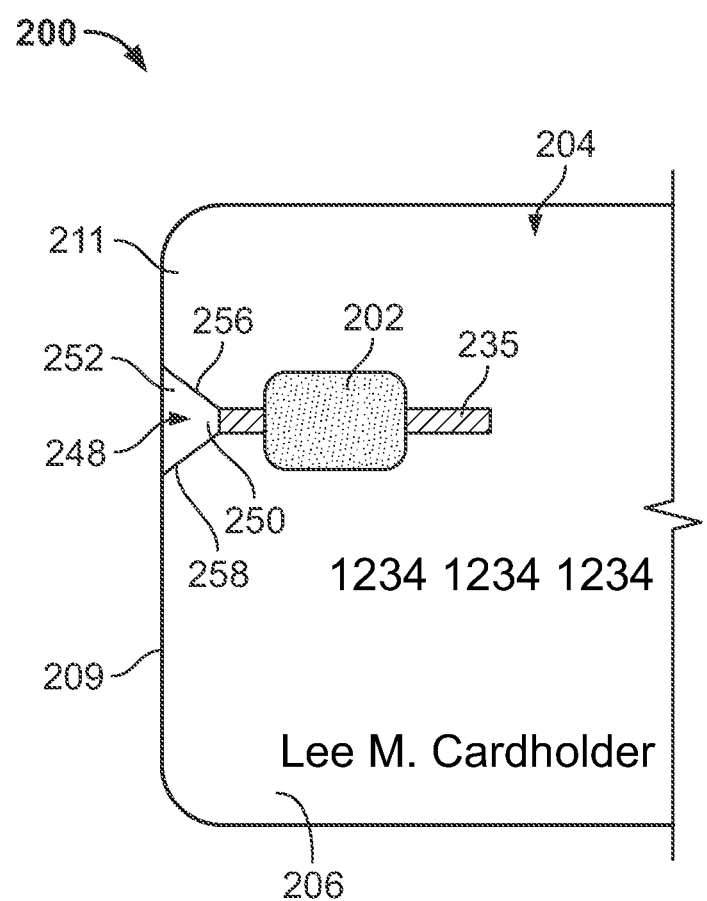
FIG. 6 is a top view of a portion of a transaction card, in accordance with embodiments of the present disclosure.

FIG. 6 demonstrates a card 200 according to another embodiment of the present disclosure. The card 200 may be the same or similar to the card 100 described herein. As such, only certain aspects of the card 200 will hereinafter be described for the sake of brevity. In this embodiment, the card 200 may include a body 204 having a removable component 248, such as a pull tab. The removable component 248 may be coupled to a tear element 235, which extends beneath an identification chip 202. The removable component 248 may have a first end 250 proximate the identification chip 202 and a second end 252 proximate a first end 211 of the body 204. As shown, the second end 252 may be planar with a side surface 209 at the first end 211 to align with an overall perimeter of the body 204. Furthermore, a top surface of the removable component 248 may be generally planar with a first main side 206 of the body 204 to ensure the removable component 248 does not interfere with reading of the identification chip 202 during use. In some embodiments, the removable component 248 may extend through an entire thickness of the card, e.g., between a front and back side thereof. In other embodiments, the removable component 248 may extend only partially through the body 204.

To remove the identification chip 202, the removable component 248 may first be separated from the body 204. In some embodiments, the removable component 248 has one or more support tabs separated by gaps (not shown) along a first side 256 and/or a second side 258 thereof. Bending or twisting the removable component 248 may cause the support tabs to break, thus freeing the removable component 248 from the body. A user may then continue to pull the removable component 248 and the tear element 235 away from the first main side 206 until the identification chip 202 is dislodged from the body 204.

Figure 7:
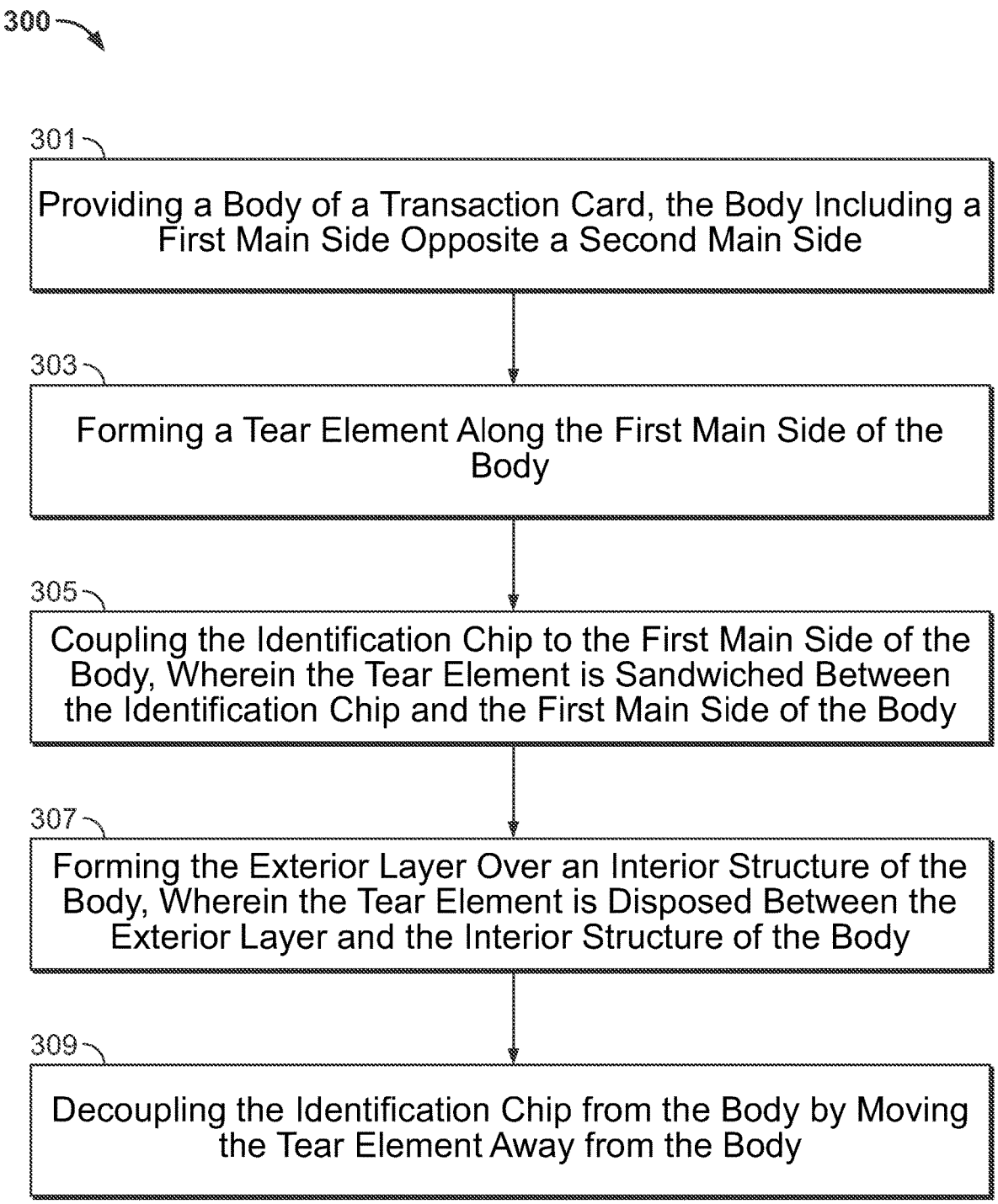
FIG. 7 illustrates a flowchart for performing methods in accordance with embodiments of the present disclosure.

Turning now to FIG. 7, a method 300 according to embodiments of the disclosure will be described in greater detail. At block 301, the method 300 may include providing a body of a transaction card, the body including a first main side opposite a second main side. In some embodiments, the transaction card may be a credit or debit card, a RFID passport, or an access card. The transaction card may include multiple layers each having one or more functions.

At block 303, the method 300 may include forming a tear element along the first main side of the body. In some embodiments, the tear element may be string, cord, line, etc., formed atop an upper surface and/or a bottom surface of an interior structure of the body. In some embodiments, the tear element may extend between a first end of the body and a recess formed in the body. In some embodiments, the tear element may be positioned within the recess, beneath an identification chip. The tear element may continue past the recess, extending along the upper surface of the interior structure. In some embodiments, the tear element may extend completely to a second end of the body. In other embodiments, the tear element may extend from a first side and/or a second side of the body. In some embodiments, the method may include further connecting the tear element to a removable component, wherein the removable component is separable from the body of the transaction card.

At block 305, the method 300 may include coupling the identification chip to the first main side of the body, wherein the tear element is sandwiched between the identification chip and the first main side of the body. In some embodiments, the identification chip may be any microprocessor device configured to exchange data electromagnetically, such as a RFID chip. The identification chip may include a radio frequency inductor, volatile or non-volatile memory storage, a microprocessor, circuitry logic, and/or an antenna.

At block 307, the method 300 may optionally include forming an exterior layer over an interior structure of the body, wherein the tear element is disposed between the exterior layer and the interior structure of the body. In some embodiments, the exterior layer may be formed over the first main side and/or the second main side of the body.

At block 309, the method 300 may optionally include decoupling the identification chip from the body by moving the tear element away from the body. In some embodiments, the exterior layer may include one or more notches, holes, cuts, thinned areas, etc., over the tear element to provide a predetermined path for the tear element through the exterior layer when pulled.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g. epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
    a body having a perimeter defined by a first end opposite a second end, and a first side opposite a second side;
    an exterior layer over the body, the exterior layer extending between the first end, the second end, the first side, and the second side;
    an identification chip coupled to the body; and
    a tear element disposed between the identification chip and the body, wherein the exterior layer is disposed over the tear element, and wherein the tear element is operable to decouple the identification chip from the body when the tear element is moved away from the body.

2. The transaction card of claim 1, wherein the exterior layer is disposed over an interior structure of the body, and wherein the tear element is disposed between the exterior layer and the interior structure.

3. The transaction card of claim 2, wherein the exterior layer comprises a notch or a set of perforations aligned over the tear element.

4. The transaction card of claim 1, the body comprising a first main side connected to a second main side by a side surface, wherein the identification chip is coupled to the first main side of the body, and wherein a magnetic stripe is disposed along the second main side.

5. The transaction card of claim 4, wherein the tear element extends along the first main side.

6. The transaction card of claim 4, wherein the tear element extends along the first main side, the side surface, and the second main side.

7. The transaction card of claim 1, the body further comprising a removable component coupled to the body, the removable component coupled to the tear element.

8. The transaction card of claim 7, wherein the removable component is a tab of the body or an adhesive cover coupled to the body.

9. The transaction card of claim 7, wherein the removable component is further coupled to a free end of the tear element.

10. A transaction card, comprising:
    a body including a first main side opposite a second main side, wherein the body has a perimeter defined by a first end opposite a second end, and a first side opposite a second side;
    an exterior layer over the body, the exterior layer extending between the first end, the second end, the first side, and the second side;
    an identification chip coupled to the first main side of the body; and
    a tear strip sandwiched between the identification chip and the first main side of the body, wherein the exterior layer is disposed over the tear strip, and wherein the tear strip is operable to decouple the identification chip from the body when the tear strip is moved away from the body.

11. The transaction card of claim 10, wherein the exterior layer is disposed over an interior structure, and wherein the tear strip is disposed between the exterior layer and the interior structure.

12. The transaction card of claim 11, wherein the exterior layer comprises a notch or a set of perforations aligned over the tear strip.

13. The transaction card of claim 10, further comprising a side surface connecting the first main side and the second main side, wherein the identification chip is positioned within a recess of the first main side of the body, and wherein a magnetic stripe is disposed along the second main side.

14. The transaction card of claim 13, wherein the tear strip extends within the recess, beneath the identification chip.

15. The transaction card of claim 13, wherein the tear strip extends along the first main side, the side surface, and the second main side.

16. The transaction card of claim 10, further comprising a removable component coupled to the body, the removable component coupled to a free end of the tear strip.

17. A method, comprising:
providing a body of a transaction card, the body including a first main side opposite a second main side, wherein the body has a perimeter defined by a first end opposite a second end, and a first side opposite a second side;
providing an exterior layer over the body, the exterior layer extending between the first end, the second end, the first side, and the second side;
forming a tear element along the first main side of the body; and
coupling an identification chip to the first main side of the body, wherein the exterior layer is disposed over the tear element, and wherein the tear element is sandwiched between the identification chip and the first main side of the body.

18. The method of claim 17, further comprising forming the exterior layer over an interior structure of the body, wherein the tear element is disposed between the exterior layer and the interior structure of the body.

19. The method of claim 17, further comprising connecting the tear element to a removable component, wherein the removable component is separable from the body of the transaction card.

20. The method of claim 17, further comprising decoupling the identification chip from the body by moving the tear element away from the body.

* * * * *